Jan. 21, 1941. R. SHERWOOD 2,229,259
TROLLING HOOK
Filed May 29, 1939
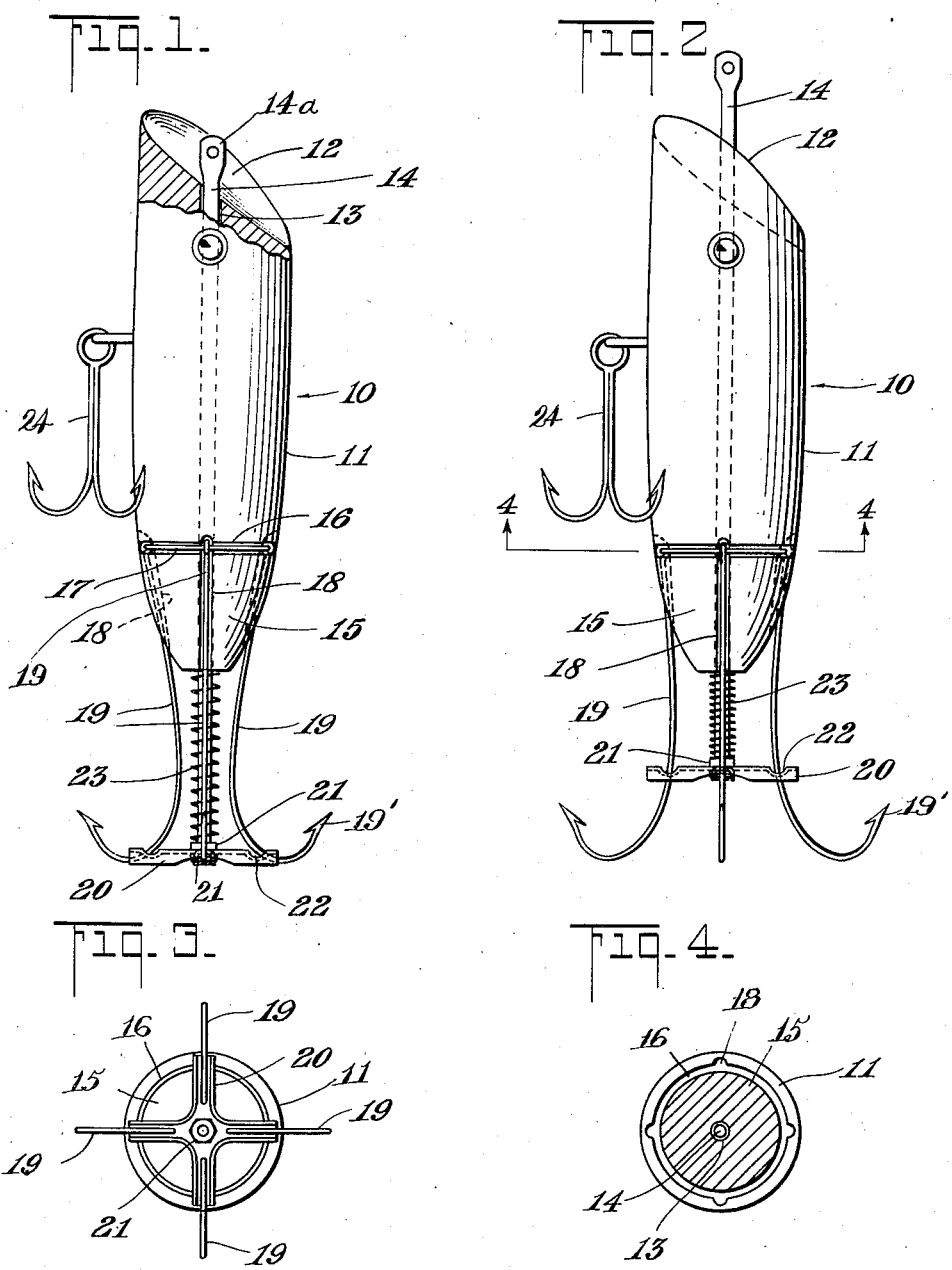
INVENTOR.
ROBERT SHERWOOD
BY
ATTORNEY.

Patented Jan. 21, 1941

2,229,259

UNITED STATES PATENT OFFICE 2,229,259

TROLLING HOOK

Robert Sherwood, New York, N. Y.

Application May 29, 1939, Serial No. 276,308

4 Claims. (Cl. 43—36)

This invention relates generally to a trolling-hook, but more specifically to a type of trolling-hook wherein the fish hooks thereof are capable of assuming convergent and divergent positions.

The main object of the invention is to provide a simple form of trolling-hook wherein the shanks of the fish hooks are made to diverge when there is tension on the line and to converge upon the removal of tension.

Another object of the invention resides in the provision of a trolling-hook wherein the shanks of the fish hooks are capable of being brought together beyond the normal position by application of hand pressure whereby the barbs of the hooks are more easily removed from the mouth of a fish.

Another object of the invention resides in the provision of a trolling-hook which is simple in construction, economical to manufacture, efficient in operation, and easily accessible for purposes of repair and adjustment.

These objects and other incidental ends and advantages of the invention will hereinafter appear in the progress of the disclosure and as pointed out in the appended claims.

Accompanying this specification is a drawing showing a preferred form of the invention wherein corresponding reference characters designate corresponding parts throughout the several views and wherein:

Figure 1 is a longitudinal view in elevation partly in section showing the device wherein the fish hooks are in normal converging positions.

Figure 2 is a view in elevation similar to Figure 1 showing the fish hooks spread apart and the central stem under tension against the action of a spring.

Figure 3 is a bottom plan view of the guide plate and fish hooks passing therethrough.

Figure 4 is a transverse sectional view of the device taken along the plane 4—4 of Figure 2, with the hooks and ring removed.

In accordance with the invention and in accordance with the preferred form shown in the drawing, the trolling-hook generally designated by numeral 10 has a body 11 which is preferably tubular, the lower end of which is tapered as at 15. The upper end of body 11 is provided with an angularly disposed recess 12 from which the upper end of a shaft 14 projects. The shaft 14 is adapted to penetrate a central bore 13 of body 11, the upper end of the shaft having a flattened and orificed portion 14a adapted to serve as a stop for the downward movement of shaft 14 in body 11 and also adapted to serve as a connecting member for the line.

Along the tapered portion 15 of body 11, is a peripheral groove 16 intersected by a series of downwardly converging grooves 18. Embodied in the downwardly converging grooves 18 are the upper portions of fish hooks 19, the upper ends of said fish hooks 19 being pivoted to a ring 17 mounted within the peripheral groove 16. The ring 17 may be comprised of any material such as a wire whose ends are joined together while the pivotal mounting of fish hooks 19 on ring 17 is accomplished by turning the upper ends thereof over the said ring.

The hooks 19 are passed through openings 22 in the arms of a lower guide-plate 20, the said guide-plate being secured to the lower end of shaft 14 in any suitable manner as by the use of securing nuts 21. Secured between the lower end of body 11 and the guide-plate 20, is a coil spring 23 which is adapted to normally converge the fish hooks 19 and the barbs 19' associated therewith together. When a fish is caught on one or more of the hooks 19 and the line is drawn in, shaft 14 is raised and the coil spring 23 is compressed thereby causing a rise in the guide plate 20. Such a rise causes a divergence of the fish hooks 19 as seen in Figure 2. This results in the further penetration of the hooks into the roof of the mouth of the fish.

It may be seen from the construction of the trolling-hook shown in Figure 1, that the normal expansion of spring 23 maintains a convergent grouping of hooks 19, in the absence of any external pressure on shaft 14. However, after a fish has been pulled in, it might be desirable to further converge the hooks 19 for purposes of easing the withdrawal thereof from the mouth of the fish. For this purpose, finger pressure is applied to the top of shaft 14 thereby causing an abnormal lowering of guide plate 20 to aid in the withdrawal of barb or barbs 19' from the mouth of the fish. Upon the release of pressure on shaft 14, the guide plate 20 assumes its natural position, depending upon the normal expansion of the coil spring 23.

The body 11 may also be provided with a conventional hook 24 serving the functions of an ordinary fishing hook on which bait may be applied.

It is to be observed that the trolling hook above described will operate efficiently whether a fish is caught on one or more of the fish hooks 19. In the struggle of the fish to get loose or in the tension developed during the pulling in of the line, the barb or barbs 19' has a tendency to penetrate deeper into the mouth of the fish. In addition to the purposes of the invention aforementioned, spring 23 takes up undue strain in the line when a fish is struggling to escape. The elimination or the reduction of this strain reduces the cause for tears and breaks in the line.

I wish it understood that minor changes and variations in the integration, material, location and connection of the parts may all be resorted to without departing from the spirit of the invention and without departing from the scope of the appended claims.

I claim:

1. A device of the character described comprising a tubular body, a shaft mounted within said body and having a guide plate carried beyond the lower end of said body, a spring between said guide plate and the lower end of said body, and hooks passing through said guide plate and having the upper ends pivoted to said tubular body, the hooks being adapted to diverge upon the raising of the shaft carrying the guide plate and to converge upon the lowering of the said shaft.

2. A device of the character described comprising a body member, a shaft slidably mounted in said body member and having a guide plate carried at the lower end beyond said body, hooks passing through said guide plate and having the upper ends pivoted to said tubular body, and a coil spring mounted between the lower end of the body member and the guide plates to maintain the shaft in normally extended position, the hooks being adapted to diverge upon the raising of the shaft carrying the guide plate and to converge upon the automatic return of the said shaft.

3. A device of the character described comprising a body member, a shaft slidably mounted in said body member and having a guide plate carried at the lower end beyond the said body, hooks passing through said guide plate and having the upper ends carried by said tubular body, and a coil spring mounted between the lower end of the body member and the guide plate to maintain the shaft in normally extended position, the hooks being adapted to diverge upon the raising of the shaft carrying the guide plate and to converge upon both the automatic return of the said shaft and an additional lowering thereof.

4. A device of the character described comprising a body member, a shaft slidably mounted in said body member and having a guide plate carried at the lower end beyond said body, hooks on which said guide plate is slidable, the said hooks being pivotally mounted at the upper ends to the body member, and a coil spring mounted between the lower end of the body member and the guide plate to maintain the shaft in normally extended position, the hooks being adapted to diverge upon the raising of the shaft carrying the guide plate and to converge upon the automatic return of the shaft.

ROBERT SHERWOOD.